United States Patent [19]
Kobayashi et al.

[11] Patent Number: 5,883,494
[45] Date of Patent: Mar. 16, 1999

[54] CHARGING APPARATUS

[75] Inventors: Atsushi Kobayashi; Jyunji Matsushima; Teruaki Honda; Yutaka Ishihara, all of Tokyo, Japan

[73] Assignee: Mitsubishi Denki Kabushiki Kaisha, Tokyo, Japan

[21] Appl. No.: 749,768

[22] Filed: Nov. 20, 1996

[30] Foreign Application Priority Data

Aug. 12, 1996 [JP] Japan .................................. 8-212903

[51] Int. Cl.⁶ .................................................. H02J 7/00
[52] U.S. Cl. ........................ 320/115; 320/113; 320/111; 320/138
[58] Field of Search ................................ 320/2, 56, 111, 320/107, 112, 113, 114, 115, 138, 140, DIG. 11, 125; 363/125; 323/282; 307/45, 46, 66, 67

[56] References Cited

U.S. PATENT DOCUMENTS

| | | | |
|---|---|---|---|
| 4,160,941 | 7/1979 | Bennett | 320/138 |
| 4,514,790 | 4/1985 | Will | 320/111 |
| 4,540,929 | 9/1985 | Binkley | 320/2 |
| 4,611,161 | 9/1986 | Barker | 320/2 |
| 4,857,702 | 8/1989 | Cafaro | 320/111 |
| 4,860,185 | 8/1989 | Brewer | 363/41 |
| 5,039,930 | 8/1991 | Collier et al. | 320/2 |
| 5,160,879 | 11/1992 | Tortola et al. | 320/2 |
| 5,229,703 | 7/1993 | Harris | 320/107 |
| 5,372,514 | 12/1994 | Odemer et al. | 320/115 |
| 5,420,496 | 5/1995 | Ishikawa | 320/138 |
| 5,497,245 | 3/1996 | Uchida | 358/406 |
| 5,635,814 | 6/1997 | Afzal et al. | 320/111 |
| 5,648,712 | 7/1997 | Hahn | 320/111 |
| 5,721,481 | 2/1998 | Narita et al. | 320/111 |

FOREIGN PATENT DOCUMENTS 5-38058  2/1993  Japan .

Primary Examiner—Peter S. Wong
Assistant Examiner—K. Shin
Attorney, Agent, or Firm—Rothwell, Figg, Ernst & Kurz

[57] ABSTRACT

In a case where an AC power is supplied from an AC power source to an AC circuit unit, the AC circuit unit and an DC circuit are connected to each other, a DC power is supplied from the AC circuit unit to the DC circuit unit, the DC power is converted to a required working voltage, and on the other hand, in a case where a DC power is supplied from a DC power source to the DC circuit unit, the DC power is converted to a required working voltage, and the DC power obtained as described above is used as a charging power for charging the secondary battery.

6 Claims, 12 Drawing Sheets

CHARGING APPARATUS

FIELD OF THE INVENTION

The present invention relates to a charging apparatus, and more particularly to a charging apparatus for charging a secondary battery applied to electric appliances such as a portable telephone.

BACKGROUND OF THE INVENTION

FIG. 12 is a block diagram schematically showing a conventional type of charging apparatus disclosed, for instance, in Japanese Patent Laid-Open Publication No. HEI 5-38058. The charging apparatus shown in FIG. 12 comprises an AC circuit unit 102 and a DC circuit unit 105 with a connector 109 provided therein, and connects the AC circuit unit 102 to the connector 109 of the DC circuit unit 105 for electrical connection between the circuit units.

The AC circuit unit 102 comprises an AC adaptor circuit 103 for converting an AC power supplied from an AC input receptacle 101 to a DC power, and a charging circuit 104 for controlling a charging operation of the DC circuit unit 105.

The DC circuit unit 105 comprises the connector 109 for electrical connection to the AC circuit unit 102, a battery pack 108 which is a secondary battery to be charged, switches SW1 and SW2 each for controlling charging and power supply, a DC—DC converter 106 for converting a DC power supplied from the battery pack 108 or an AC adaptor circuit of the AC circuit unit 102 to a required working voltage, and a logic circuit 107 for receiving a DC power and driving the DC circuit unit 105.

Next description is made for operations. In the charging apparatus shown in FIG. 12, when the AC circuit unit 102 and the DC circuit unit 105 are connected to each other with the connector 109, a DC power is supplied from the AC adaptor circuit 103 via the AC input receptacle 101 to the charging circuit 104 inside the AC circuit unit 102 and then to the DC circuit unit 105 as an external device.

When the AC circuit unit 102 is connected to the connector 109, the switch SW2 is automatically turned OFF, so that the battery pack 108 is electrically disconnected from other circuits in the DC circuit unit 105. Upon power supply from the AC adaptor circuit 103, the charging circuit 104 starts charging to the battery pack 108.

In this step, when the switch SW1 is turned ON, the AC adaptor circuit 103 and the DC—DC converter 106 are electrically connected to each other, and the DC power outputted from the AC adaptor circuit 103 is supplied also to the DC—DC converter 106. As a result the charging apparatus drives the logic circuit 107 charging the battery pack 108.

After charging is complete, in a case where the AC circuit unit 102 is separated from the connector 109, the switch SW 2 is automatically turned ON, so that each circuit in the DC circuit unit 105 is electrically connected to the battery pack 108. In this case, the DC circuit unit 105 runs using the battery pack 108 as a main power source.

With the charging apparatus based on the conventional technology as described above, after the AC circuit unit 102 comprising the AC adaptor circuit 103 is connected to the DC circuit unit 105 comprising the DC—DC converter 106, an operation for charging the battery pack 108 in the DC circuit unit 105 is started according to the charging control by the charging circuit 104 in the AC circuit unit 102, so that, for the purpose of an application for charging the battery pack 108 with an input power from the AC input receptacle 101, combination of the AC circuit unit 102 and the DC circuit unit 105 is available for the same purpose.

Thus as combination of the AC circuit unit 102 and DC circuit unit 105 is applicable only to the limited applications as described above, it is impossible to use each circuit unit as a single body, and also if a purpose of charging is different, a different charging apparatus must be prepared according to the use, and in that case a number of charging apparatuses according to a number of uses are required.

SUMMARY OF THE INVENTION

It is an object of the present invention to obtain a charging apparatus in which a combination of an AC circuit unit and a DC circuit unit can be applied to various uses and also in which each circuit can be used as a single body according to the application.

A charging apparatus according to the present invention, in a case where an AC power is supplied from an AC power source to the AC circuit unit, connects the AC circuit unit to the DC circuit unit, supplies a DC power from the AC circuit unit to the DC circuit unit, and converts the DC power to a required working voltage, while in a case where a DC power is supplied from the DC power source to the DC circuit unit, the apparatus converts the DC power to a required working voltage, and charges a secondary battery with the DC power obtained as described above as a charging power, so that the AC circuit unit and DC circuit unit can be applied to plurality types of uses, and each circuit unit can also be used as a single body for various purposes.

A charging apparatus according to another feature of the present invention, in a case where an AC power is supplied to the AC circuit unit, covers a position of the DC circuit unit in which a DC power supply means is set, and exposes to outside a position of the AC circuit unit in which an AC power supply means is set, and in a case where a DC power is supplied to the DC circuit unit, the apparatus covers a position of the AC circuit unit in which the DC power supply means is set, and exposes to outside a position of the DC circuit unit in which the DC power supply means is set, and for this reason, only the supply power side must be covered when charging is executed, and with this feature erroneous insertion of a power plug can be prevented.

A charging apparatus according to another feature of the present invention, in a case where an AC power is supplied from the AC power source to the AC circuit unit, connects the AC circuit unit to the DC circuit unit, pivots a rotary AC power supply means to a desired position about the AC circuit unit as an axis, supplies a DC power from the AC circuit unit to the DC circuit unit, and converts the DC power to a required working voltage, while in a case where a DC power is supplied from the DC power source to the DC circuit unit, the apparatus converts the DC power to a required working voltage, and charges a secondary battery with the DC power obtained as described above as a charging power, so that the AC circuit unit and DC circuit unit can be applied to plurality types of uses, and each circuit unit can also be used as a single body for various purposes.

A charging apparatus according to another feature of the present invention, in a case where an AC power is supplied to the AC circuit unit, covers a position of the DC circuit unit in which the DC power supply means is set, and exposes the other edge thereof to outside by rotating the rotary AC power supply means, and in a case where a DC power is supplied to the DC circuit unit, rotates the rotary AC power supply means, accommodates it inside thereof to cover it from outside, and exposes to outside a position of the DC circuit unit in which the DC power supply means is set, and for this reason, only the supply power side must be covered when charging is executed, and with this feature erroneous insertion of a power plug can be prevented.

A charging apparatus according to another feature of the present invention, in a case where an AC power is supplied from the AC power source to the AC circuit unit, connects the AC circuit unit to the DC circuit unit, supplies a DC power from the AC circuit unit to the DC circuit unit, and converts the DC power to a required working voltage, while in a case where a DC power is supplied from the DC power source to the DC circuit unit, the apparatus converts the DC power to a required working voltage, and supplies the DC power obtained as described above to an external device as a charging power by connecting the DC circuit unit to the external device, so that the AC circuit unit and DC circuit unit can be applied to the purpose of charging a secondary battery of the external device.

In a charging apparatus according to another feature of the present invention, a main body thereof comprises a first accommodating section for accommodating the external device and a second accommodating section for accommodating a circuit section, and the first accommodating section covers the external device with a cover based on an open and shut system and an object to be hooked can be hooked by a hook section, so that the external device can easily be put into and taken out of the first accommodating section by opening/closing the cover, and can easily be portable by hooking the hook section in the object to be hooked.

In a charging apparatus according to another feature of the present invention, a main body thereof comprises a first accommodating section for accommodating the external device and a second accommodating section for accommodating a circuit section, and the first accommodating section covers the external device with a cover detachably provided thereon, and an object to be hooked can be hooked by a hook section, so that the external device can easily be put into and taken out of the first accommodating section by detaching/attaching the cover, and can easily be portable by hooking the hook section in the object to be hooked.

In a charging apparatus according to another feature of the present invention, a main body thereof comprises a first accommodating section for accommodating the external device and a second accommodating section for accommodating a circuit section, and the first accommodating section covers the external device with a cover, and an object to be hooked can be hooked by a hook section, so that the external device can easily be put into and taken out of the first accommodating section by detaching/attaching the cover, and can easily be portable by hooking the hook section in the object to be hooked, and especially, the AC circuit unit and DC circuit unit can be applied to plurality types of uses, and each circuit unit can also be used as a single body for various purposes.

Other objects and features of this invention will become understood from the following description with reference to the accompanying drawings.

DESCRIPTION OF THE PREFERRED EMBODIMENTS

Next detailed description is made for preferred embodiments of the present invention with reference to the related drawings.

Figure 1:
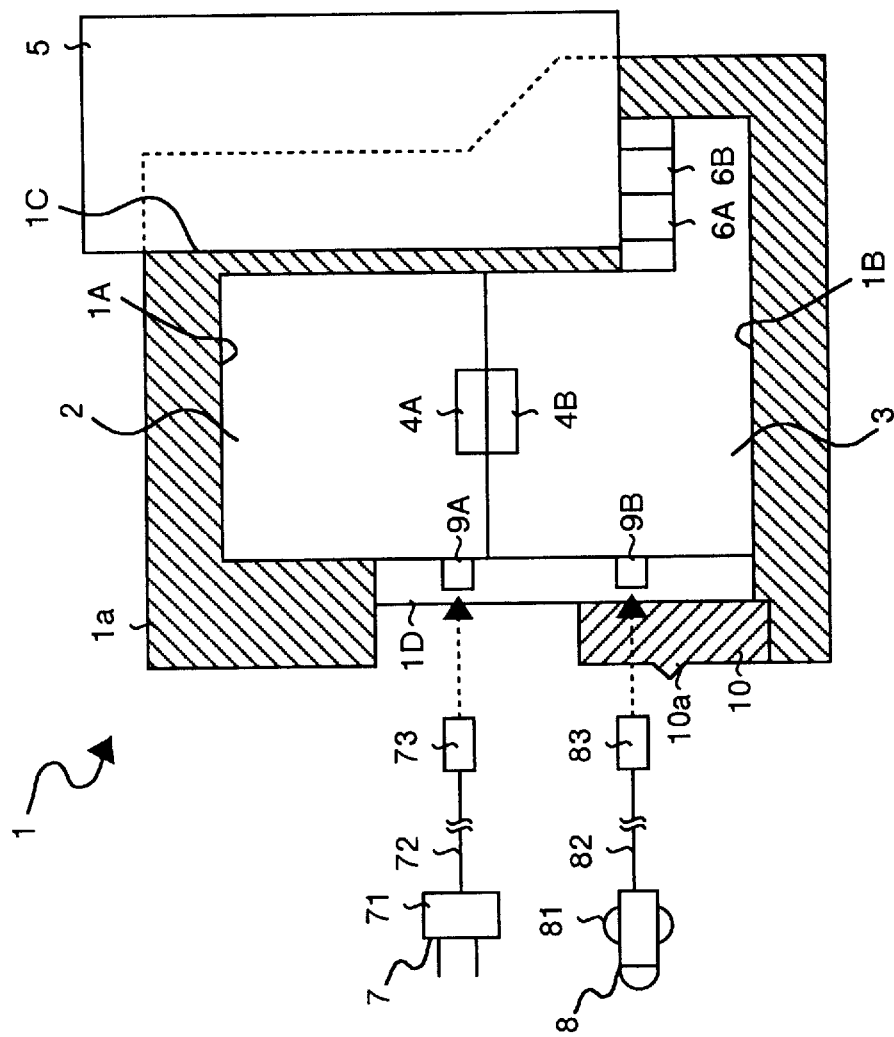
FIG. 1 is a cross-sectional view schematically showing a charging apparatus according to Embodiment 1 of the present invention.

FIG. 1 is a cross-sectional view schematically showing a charging apparatus according to Embodiment 1 of the present invention, and in this figure, the reference numeral 1 indicates a charging apparatus.

The charging apparatus 1 shown in FIG. 1 comprises, for instance, a main body 1a, an AC circuit unit 2 detachably mounted to this main body 1a, a DC circuit unit 3, a secondary battery 5, and AC power supply section 7, and a DC power supply section 8.

In the AC power supply section 7, a plug 71 for an AC power connected to an AC input receptacle or the like for home use for receiving an AC power and a plug 73 connected to the AC circuit unit 2 are connected to each other with an AC power cord 72 for having a specified length.

In the DC power supply section 8, a plug 81 connected to a socket for a cigar lighter of a car or the like for receiving a DC power and a plug 83 connected to the DC circuit unit 3 are connected to each other with a DC power cord 82 having a specified length.

The AC circuit unit 2 has an AC adaptor circuit like the AC circuit unit 102 based on the conventional technology described above and a charging circuit and also has a socket 9A provided therein in a projecting form, to which the plug 73 of the AC power supply section 7 is detachably connected, for supplying a power to the circuits directly.

The DC circuit unit 3 has a DC—DC converter like the DC circuit unit 105 based on the conventional technology described above and a logic circuit, and also has a socket 9B provided therein in a projecting form, to which a plug 83 of the DC power supply section 8 is detachably connected, for directly supplying a DC power to the circuits.

The AC circuit unit 2 and DC circuit unit 3 have connectors 4A; 4B respectively, and the connectors 4A, 4B are located at opposite positions when accommodated in the main body 1a and are electrically connected to each other. For this reason, the AC circuit unit 2 and DC circuit unit 3 have separated and independent circuit configurations respectively.

Provided in the main body 1a are accommodating sections 1A, 1B, and 1C for accommodating therein the AC circuit unit 2, DC circuit unit 3, and secondary battery 5, respectively. The accommodating sections 1A, 1B for accommodating the AC circuit unit 2 and DC circuit unit 3 respectively communicate with an insertion hole 1D, to which the plug 73 of the AC power supply section 7 and the plug 83 of the DC power supply section 8 are inserted from outside for connection to the corresponding sockets 9A, 9B respectively.

To the main body 1a, a slidingly movable slide cover 10 for covering either one of the sockets 9A, 9B located in the insertion hole 1D from outside is attached. A projection 10a is provided on a surface of this slide cover 10, and when this projection 10a is moved upward with a finger (Refer to FIG. 3), the socket 9A is covered, and socket 9B is accessible to the outside, and when the projection 10a is moved downward (Refer to FIG. 3), the socket 9B is covered, and socket 9A is accessible to the outside.

And in the main body 1a, the accommodating section 1B and accommodating section 1C are positioned so that they hold terminals 6A and 6B therebetween. In a state where the DC circuit unit 3 and secondary battery 5 have been accommodated in the accommodating section 1B and accommodating section 1C respectively, each (+) power from the DC circuit unit 3 and secondary battery 5 is connected to the terminal 6A, and each (−) power from the DC circuit unit 3 and secondary battery 5 is connected to the terminal 6B.

Next description is made for operations. There are two types of applications for the charging apparatus 1; the one for charging with input of an AC power and the other for charging with input of a DC power.

Figure 2:
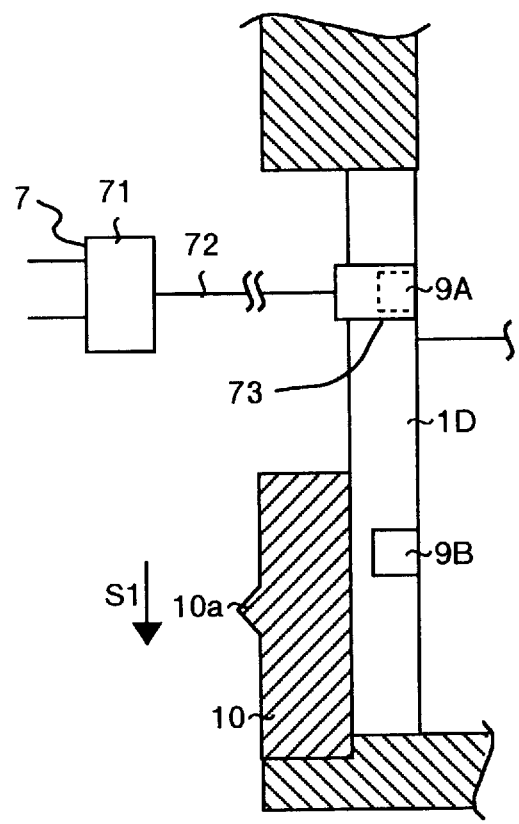
FIG. 2 is a view for explanation of an operating method for the charging apparatus when an AC power is inputted according to Embodiment 1.

At first, description is made for a charging operation with input of an AC power. FIG. 2 shows a method of operating the charging apparatus 1 when an AC power is inputted.

When charging is executed with input of an AC power, as shown in FIG. 2, the AC circuit unit 2, DC circuit unit 3, and secondary battery 5 are accommodated in the main body 1a, the socket 9B is covered by lowering the slide cover 10 as indicated by the arrow S1, and the socket 9A is exposed to outside. In this state, when the plug 73 of the AC power supply section 7 is set in the socket 9A, the apparatus is ready for charging.

Then, in a state where the charging apparatus is ready for charging, by inserting the AC power plug 71 of the AC power supply section 7 into a receptacle for an AC power at home, the AC power is supplied from the AC power source to the AC circuit unit 2. In the AC circuit unit 2, AC power is converted by an AC adaptor circuit (not shown) DC power, and the converted DC power is supplied via the connectors 4A, 4B to the DC circuit unit 3.

In the DC circuit unit 3, when a DC current supplied from the AC circuit unit 2 is converted by a DC—DC converter (not shown) to a required working voltage, and DC power obtained through the conversion above, (+) power is supplied via the terminal 6A to the secondary battery 5, while (−) power is supplied via the terminal 6B to the secondary battery 5. In the secondary battery 5, when the (+) and (−) powers are supplied from the DC circuit unit 3, charging is started using the power as charging powers.

As described above, for a charging operation with input of an AC power, combination of the AC circuit unit 2 and DC circuit unit 3 each independent and separate from each other is required, and the combination converts AC power from a source via the AC power supply section 7 and the AC circuit unit 2 to a DC power, which is further converted by the DC circuit unit 3 to a required working voltage and is used for charging the secondary battery 5.

Figure 3:
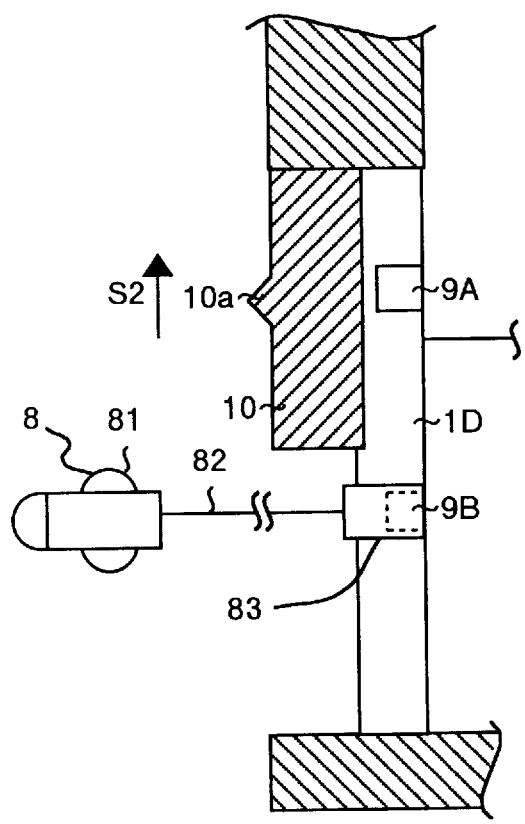
FIG. 3 is a view for explanation of an operating method for the charging apparatus when a DC power is inputted according to Embodiment 1.

Next description is made for a charging operation with input of a DC power. FIG. 3 is an explanatory view illustrating a method of operating the charging apparatus 1 when a DC power is inputted.

When charging is executed with input of a DC power, as shown in FIG. 3, the DC circuit unit 3 and the secondary battery 5 are accommodated in the main body 1a, the socket 9A is covered by raising the slide cover 10 to the direction indicated by the arrow S2, while the socket 9B is exposed to the outside. By inserting the plug 83 of the DC power supply section 8 into the socket 9B, the charging apparatus is ready for charging.

As described above, when preparation for charging is completed, by inserting the plug 81 into, for instance, a socket for a cigar lighter of a motorcar, DC power is directly supplied from the DC power source to the DC circuit unit 3.

In the DC circuit unit 3, when DC power supplied from a DC power source is converted by a DC—DC converter (not shown) to a required working voltage, the (+) power is supplied via a terminal 6A to the secondary battery 5, and the (−) power is supplied via a terminal 6B to the secondary battery 5. In the secondary battery 5, when the (+) and (−) powers are supplied from the DC circuit unit 3, a charging operation is started using the powers as charging power.

As described above, for a charging operation with input of a DC power, combination of the AC circuit unit 2 and the DC circuit unit 3 like that for charging with AC power is not required, and only the DC circuit unit 3 is used. Namely, as a socket for a cigar lighter not shown herein is used as a DC power source, the DC power can directly be supplied via the DC power supply section 8 to the DC circuit unit 3.

As described above, in Embodiment 1 of the present invention, in a case where AC power is supplied from an AC power source to the AC circuit unit 2, the AC circuit unit 2 and DC circuit unit 3 are connected to each other, a DC power is supplied from the AC circuit unit 2 to the DC circuit unit 3, the DC power is converted to a required working voltage, and in a case where a DC power is supplied from a DC power source to the DC circuit unit 3, the DC power is converted to a required working voltage, and the DC power obtained as described above is used as a charging power for charging the secondary battery, so that the AC circuit unit 2 and DC circuit unit 3 are applied to various purposes, and in addition each circuit unit can be used as a single body according to each purpose.

Also when an AC power is supplied to the AC circuit unit 2, the socket 9B to which the DC circuit unit 3 is inserted is covered, while the socket 9A into which the plug 73 of the AC circuit unit 2 is inserted is exposed and in a case where a DC power is supplied to the DC circuit unit 3, the socket 9A for the AC circuit unit 2 is covered and the socket 9B into which the plug 83 of the DC circuit unit 3 is inserted is exposed, and for this reason, only the supplied power side must be covered when charging is executed, and with this feature erroneous insertion of a power plug can be prevented.

In Embodiment 1 of the present invention described above, the AC power supply section 7 is composed of an AC power plug 71, an AC power cord 72, and a plug 73, and freedom of movement of the charging apparatus 1 is given with flexibility of AC power cord 72, but the freedom may be given by making use of rotation like in Embodiment 2 of the present invention as described below.

The charging apparatus according to Embodiment 2 of the present invention has the general configuration like that of the charging apparatus 1 according to Embodiment 1 of the present invention, so that description concerning the general configuration is omitted herein and description is made only for different sections. Also it should be noted that the same reference numerals as those in FIG. 1 are assigned to the corresponding sections.

Figure 4:
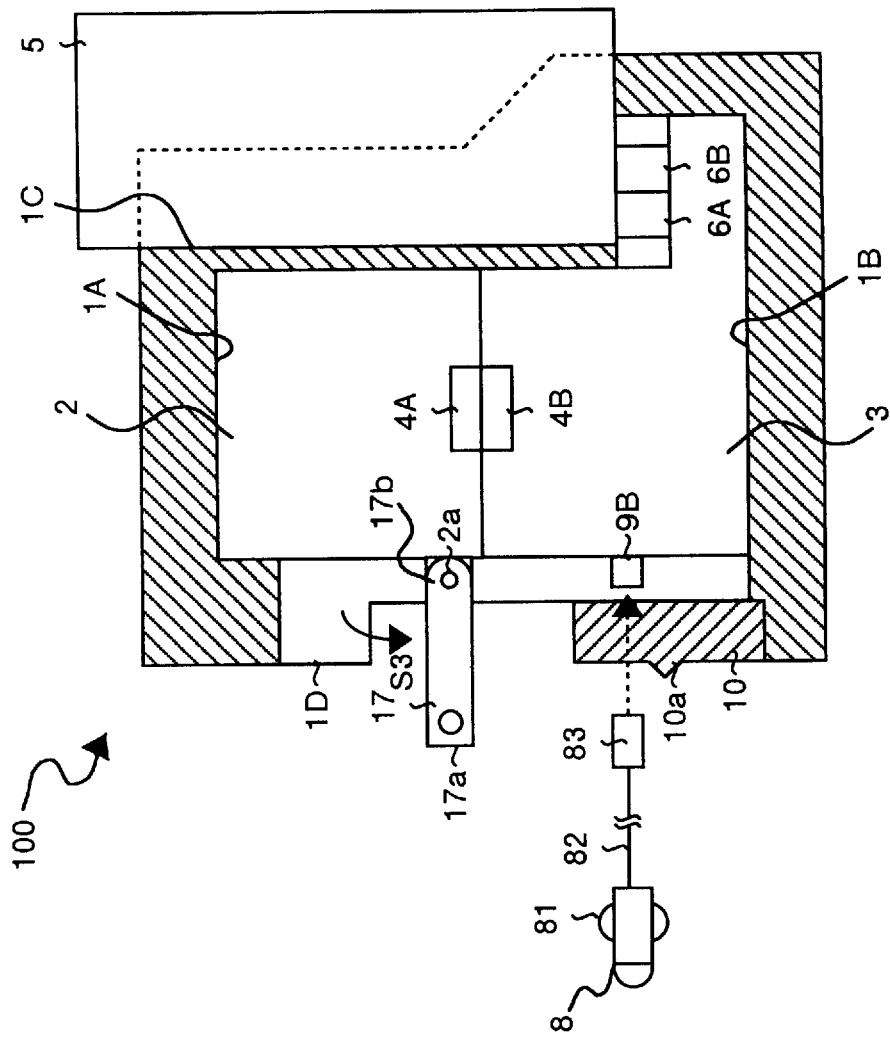
FIG. 4 is a cross-sectional view schematically showing the charging apparatus according to Embodiment 2 of the present invention.

FIG. 4 is a cross-sectional view schematically showing the charging apparatus according to Embodiment 2 of the present invention, and in the figure, the reference numeral 100 indicates a charging apparatus.

As the charging apparatus 100, as shown in FIG. 4, a rotary type of power plug 17 for an AC power is used in place of the AC power supply section 7 used in the charging apparatus 1 described above. This rotary type of power plug 17 is used to input an AC power with one edge thereof 17a connected to a receptacle for AC power input at home or the like, and is pivotally supported by a shaft section 2a with the other edge thereof 17b connected to the AC circuit unit 2.

Next description is made for operations. Also this charging apparatus 100 is used for two applications; one for charging with input of an AC power, and the other for charging with input of a DC power. Also these two applications are the same as those in Embodiment 1 described above, and description for details thereof is omitted herein.

In the charging operation, a portion different from that in Embodiment 1 is a charging operation with input of an AC power. Namely the slide cover 10 of the main body 1a is moved downward, the rotary type of power plug 17 is rotated in the direction indicated by the arrow S3 around the shaft section 2a so that the edge 17a of the rotary type of power plug 17 can be connected to an AC power source.

Then by connected the edge 17a of the rotary type of power plug 17, for instance, to an AC power source at home, the charging apparatus 100 converts an AC power to a DC power via the AC power supply section 7 and then the AC circuit unit 2 like in Embodiment 1 described above, and the DC power is furthermore converted in the DC circuit unit 3 to a required working voltage and is used for charging the secondary battery 5.

It should be noted that, in a charging operation with input of a DC power, at first the rotary type of power plug 17 is rotated in a direction contrary to that indicated by the arrow S3 described above, fallen onto a side face of the AC circuit unit 2, and then slide cover 10 is covered moved to cover the rotary type of power plug 17. With this operation, the socket 9B is exposed to outside.

Then like in Embodiment 1 described above, a socket for a cigar lighter not shown herein is used as a DC power source, the DC power is directly supplied via the DC power supply section 8 to the DC circuit unit 3, which converts the supplied DC current to a required working voltage and uses the supplied power to charge the secondary battery 5.

As described above, with Embodiment 2, in a case where an AC power is supplied from an AC power source to the AC circuit unit 2, the AC circuit unit 2 and DC circuit unit 3 are connected to each other, the rotary type of power plug 17 is rotated to a desired position around the AC circuit unit 2 as a center of rotation, A DC power is supplied from the AC circuit unit 2 to the DC circuit unit 3, the DC power is converted to a required working voltage, and on the other hand in a case where a DC power is applied from a DC power source to the DC circuit unit 3, the DC power is converted to a required working voltage, and the obtained DC power is used as a charging power for charging the secondary battery 5, so that the AC circuit unit 2 and DC circuit unit 3 can be applied to a plurality of uses and also each circuit unit can be used as a single body according to each purpose.

Also in a case where an AC power is supplied to the AC circuit unit 2, the socket 9B of the DC circuit unit 3 is covered with the rotary type of power plug 17 rotated and exposed to outside, and in a case where a DC power is supplied to the DC circuit unit 3, the rotary type of power plug 17 is rotated and covered with the socket 9B of the DC circuit unit 3 exposed to outside, so that, when charging, it is required to cover only the supplied power side, and with this construction erroneous connection can be prevented.

In Embodiment 2 of the present invention described above, the rotary type of power plug 17 is pivotally supported by the shaft section 2a of the AC circuit unit 2, but the socket 9A used in Embodiment 1 may be applied to the power supply portion of the AC circuit unit 2 as in Embodiment 3 of the present invention described below so that either a cord type or a rotary type of plug can be inserted there.

The charging apparatus according to this embodiment has the same general configuration as that of the charging apparatus 100 according to Embodiment 2, so that description concerning the general configuration is omitted herein and description is made only for different portions. Also it should be noted that the same reference numerals as those used in FIG. 1 are used to the corresponding sections.

Figure 5:
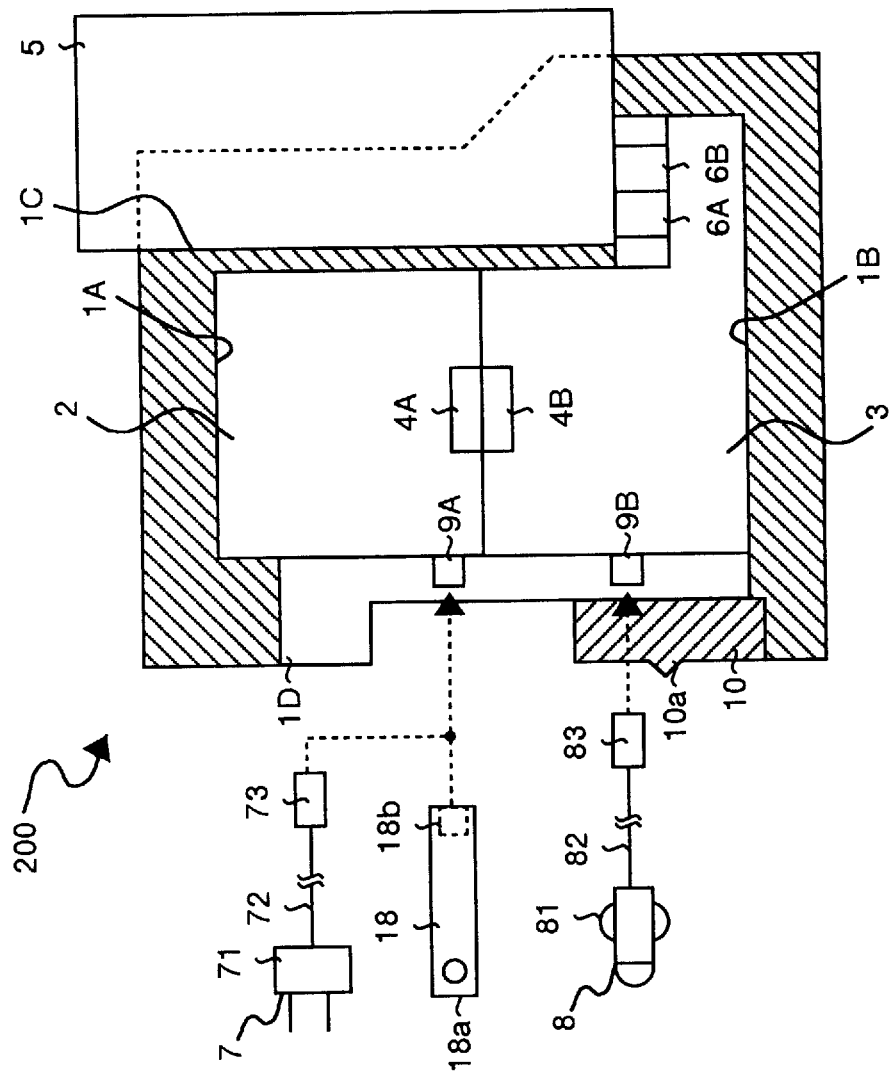
FIG. 5 is a cross-sectional view schematically showing the charging apparatus according to Embodiment 3 of the present invention.

FIG. 5 shows a cross-sectional view schematically showing Embodiment 3 of the present invention, and in this figure the reference numeral 200 indicates the charging apparatus.

In charging apparatus 200, as shown in FIG. 5, either one of the AC power supply section 7 used in the charging apparatus 1 described above and a detachable and rotary type of power plug 18 having the same function as that of the rotary type of power plug 17 for an AC power used in the charging apparatus 100 described above may be used. One edge 18a of the rotary type of power plug 18 is connected to a receptacle for an AC power at home for receiving an AC power, while the other edge 18b thereof is connected to the socket 9A of the AC circuit unit 2, so that the rotary type of power plug 18 is pivotally provided on the socket 9A.

Next description is made for operations. Also this charging apparatus 200 may be used for two applications; one for charging with input of an AC power, and the other for charging with input of a DC power. Also these two applications are the same as those described in relation to Embodiment 1 as well as to Embodiment 2, so that detailed description thereof is omitted herein.

In a charging operation with input of an AC power, if charging is executed using a cord type of power plug with input of an AC power, it is required only that the slide cover 10 is moved downward, and the plug 73 of the AC power supply section 7 is connected to the socket 9A, and on the other hand if charging is executed using a rotary type of power plug with input of an AC power, it is required that the slide cover 10 is moved downward and the socket 9A is held between electrode sections of the rotary type of power plug 18 for connection.

Then when the AC power plug 71 of the AC power supply section 7 or the edge 18a of the rotary type of power plug 18 is connected, for instance, to an AC power source at home, the charging apparatus 200 converts the AC power via the AC power supply section 7 and the AC circuit unit 2 to a DC power, like in Embodiments 1 and 2 described above, furthermore converts the DC power to a required working voltage in the DC circuit unit 3, and uses the voltage as a charging power for charging the battery 5.

For charging with input of a DC power, the AC power supply section 7 or the rotary type of power plug 18 is removed from the socket 9A and the slide cover 10 is moved upward to cover the socket 9A. With this operation, the socket 9B is exposed to outside.

Then like in Embodiments 1 and 2, a socket for cigar lighter not shown herein is used as a DC power source, the DC power is directly supplied via the DC power supply section 8 to the DC circuit unit 3, the DC circuit unit 3 converts the supplied DC power to a required working voltage and charges the secondary battery 5 using the power as a charging power.

As described above, with Embodiment 3 of the present invention, the same effects as those in Embodiment 1 can be obtained, and in addition variations can be obtained for input of an AC power.

Description of Embodiments 1 to 3 above assumes a case of a charging apparatus which are applied to two applications; one for charging with input of an AC power and the other for charging with input of a DC power, but a DC power (a DC power from a charging power source) may directly be supplied to external electronic equipment by giving some variations to charging with input of a DC power like in Embodiment 4 of the present invention described below.

The charging apparatus according to Embodiment 4 has the same general configuration as the charging apparatus 200 in Embodiment 3 as a representative of Embodiments 1 to 3 described above, so that detailed description concerning the general configuration is omitted herein, and description is made for only different portions. Also the same reference numerals as those used in FIG. 5 (showing Embodiment 3) are used to the corresponding sections.

Figure 6:
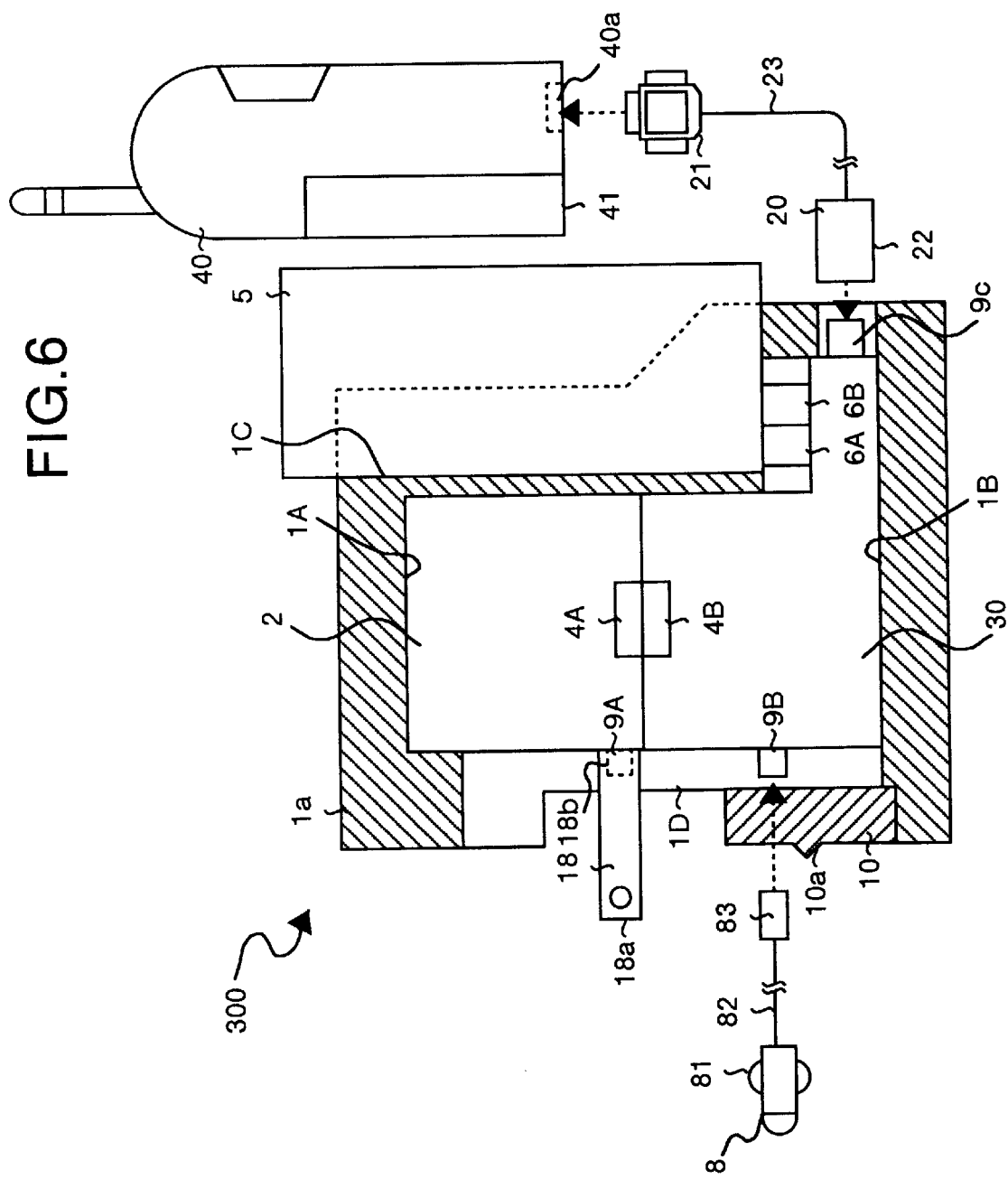
FIG. 6 is a cross-sectional view schematically showing the charging apparatus according to Embodiment 4 of the present invention.

FIG. 6 is a cross-sectional view schematically showing a charging apparatus according to Embodiment 4 of the present invention, and in this figure designated at the reference number 20 is a DC power supply section for connecting a charging apparatus 300 described later to a portable telephone set 40, at 40 a portable telephone which is an electronic device, and at 300 a charging apparatus.

The portable telephone set 40 comprises a detachably mounted secondary battery 41 as shown in FIG. 6, and works using this secondary battery 41 as a main power source. A connector 40a for fetching a power from outside for supplying a DC power to the secondary battery 41 is provided in the lower section of the portable telephone set 40.

The charging apparatus 300 has the same configuration as that in, for instance, Embodiment 3 (the charging apparatus 200 shown in FIG. 5), and has a DC circuit unit 30 which has, in addition to the socket 9B, a socket 9C for input of a DC power in place of the DC circuit unit 3.

The DC power supply section 20 comprises an I/O connector 21 connected to the connector 40a of the portable telephone set 40 and outputting a DC power to the connector 40a, a plug 22 connected to the socket 9C of the DC circuit unit 30 and receiving a DC power from the socket 9C, and an I/O connector cable 23 connecting the I/O connector 21 to the plug 22.

Next description is made for operations. The charging apparatus 300 may be used, in addition to charging the secondary battery 5 commonly executed in Embodiments 1 to 3, for charging a secondary battery 41 of the portable telephone set 40 which is an external device.

At first, of components of the DC power supply section 20, the plug 22 is connected to the socket 9C of the DC circuit unit 30, and also the I/O connector 21 is connected to the connector 40a of the portable telephone set 40. In this step, the DC circuit unit 30 and secondary battery 5 are previously connected to the charging apparatus 300, and the secondary battery 41 is connected to the portable telephone set 40. In a charging operation with input of an AC power, like in Embodiment 3 described above, the AC power supply section 7 or the rotary type of power plug 18 is connected to the socket 9A according to whether the power plug is of a cord type or a rotary type.

Then when the AC power plug 71 of the AC power supply section 7 or the one edge 18a of the rotary type of power plug 18 is connected, for instance, to an AC power source at home, the charging apparatus 300 converts, like in Embodiment 3 described above, the AC power via the AC power supply section 7 and the AC circuit unit 2 to a DC power, and further converts the DC power to a required working voltage in the DC circuit unit 30, and charges the secondary battery 5 using the power as a charging power.

Furthermore in the charging apparatus 300, the DC power supplied from the AC circuit unit 2 to the DC circuit unit 30 and converted via a DC—DC converter not shown herein to a required working voltage is outputted from the socket 9C to the DC power supply section 20. The DC power inputted into the DC power supply section 20 is supplied via the connector 40a into a main body of the portable telephone set 40. The portable telephone set 40 charges, when a DC power is supplied thereto via the DC power supply section 20, the secondary battery 41 using the DC power as a charging power.

On the other hand, in a charging operation with input of a DC power, like in Embodiment 3 described above, a socket for a cigar lighter not shown herein is used as a power source, the DC power is directly supplied via the DC power supply section 8 to the DC circuit unit 30, the DC circuit unit 30 converts the supplied DC power to a required working voltage and charges the secondary battery 5 using the power as a charging power.

Also in the charging apparatus 300, the DC power directly supplied to the DC circuit unit 30 is converted by a DC—DC converter not shown herein to a required working voltage and then outputted from the socket 9C to the DC power supply section 20. The DC power inputted into the DC power supply section 20 is supplied via the connector 40a to a main body of the portable telephone set 40.

Then in the subsequent operation, like the charging operation with input of an AC power, when a DC power is supplied via the DC power supply section 20 to the portable telephone set 40, the portable telephone set 40 charges the secondary battery 41 using the DC power as a charging power.

As described above, with Embodiment 4, in a case where an AC power is supplied from an AC power source to the AC circuit unit, the AC circuit unit 2 and the DC circuit unit 30 are connected to each other, a DC power is supplied from the AC circuit unit 2 to the DC circuit unit 30, the DC power is converted to a required working voltage, and in a case where a DC power is supplied from a DC power source to the DC circuit unit 30, the DC power is converted to a required working voltage, and the DC power obtained as described above is supplied as a charging power to the portable telephone set 40 by connecting the DC circuit unit 30 to the portable telephone set 40 using the I/O connector 21 or the like, so that the AC circuit unit 2 and the DC circuit unit 30 can be applied to a use for the secondary battery 41 of the portable telephone set 40 which is an external device.

Description of Embodiment 4 above assumes a case where the rotary type of power plug 18 (or the AC power supply section 7) is connected to the socket 9A like in Embodiment 3, but the configuration like that in Embodiment 4 may be applied to Embodiment 1 or Embodiment 2.

In Embodiment 4 of the present invention described above, the secondary battery 41 of a potable telephone set 40 is charged by connecting the portable telephone set 40 to the charging apparatus 300 with the cable type of DC power supply section 20, but a portable telephone set and a charging apparatus may be combined into one unit so that it can be portable like in Embodiment 5 of the present invention as described below.

The charging apparatus according to Embodiment 5 of the present invention has the general configuration like that of the charging apparatus 200 according to Embodiment 3 of the present invention, so that description concerning the general configuration is omitted herein and description is made only for different sections. Also it should be noted that the same reference numerals are assigned to the same sections as those in FIG. 5.

Figure 7:
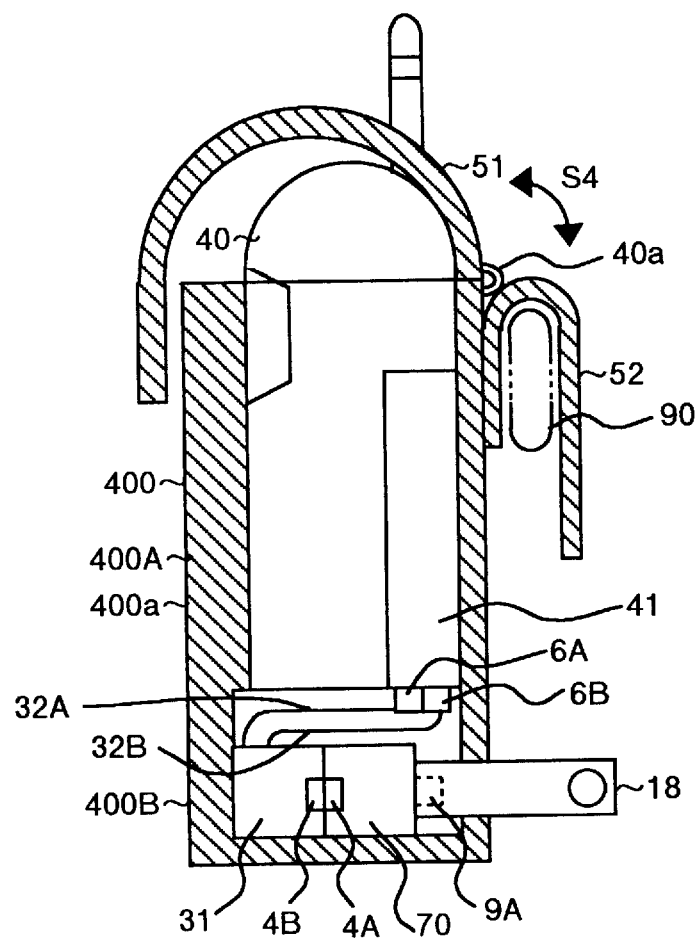
FIG. 7 is a cross-sectional view schematically showing the charging apparatus according to Embodiment 5 of the present invention.

FIG. 7 is a cross-sectional view schematically showing the charging apparatus according to Embodiment 5, and in the figure, the reference numeral 400 indicates a potable type of charging apparatus.

The charging apparatus 400, as shown in FIG. 7, has the general configuration, for instance, like that according to Embodiment 3 of the present invention (the charging apparatus 200 shown in FIG. 5), and also has an AC circuit unit 70 connected to the rotary type of power plug 18 as an example and a DC circuit unit 31 for connecting the terminals 6A, 6B with cables 32A, 32B, respectively. The DC circuit unit 31 does not save the socket 9B for directly receiving a DC power supplied from outside, and is operated with a DC power supplied from the AC circuit unit 70.

A main body 400a of the charging apparatus 400 according to Embodiment 5 has an accommodating section 400A for directly accommodating the portable telephone set 400, and an accommodating section 400B for mounting thereon circuits of the AC circuit unit 70 and DC circuit unit 31 or the like.

The terminals 6A, 6B are connected to the secondary battery 41 set in the portable telephone set 40 accommodated in the accommodating section 400A so that a DC power can directly be supplied from the DC circuit unit 31 without using the DC power supply section 20 described above. It should be noted that a DC power outputted from the DC circuit unit 31 to the cables 32A, 32B is converted to a required working voltage with a DC—DC converter in the DC circuit unit 31.

A length of the accommodating section 400A is set so that the upper section of the portable telephone set 40 is slightly exposed to outside, and a cover 51 based on an open and shut system for covering the exposed portion of the portable telephone set 40 along the form thereof is provided therein. Also the accommodating section 400A has a hook section 52, which is hooked in a belt 90 (two dot-chain line in the figure), provided in the rear surface (at the right side in the figure).

The cover 51 based on an open and shut system described above is pivotally supported by the axis 40a in the accommodating section 400A, and is rotated in a direction indicated by the arrow S4 for accommodation of the portable telephone set 40 in the accommodating section and taking it out therefrom.

Next description is made for operations. At first the secondary battery 41 is set in the potable telephone set 40, the potable telephone set 40 is accommodated in the accommodating section 400A by opening the open and shut system cover 51, the terminals 6A, 6B are connected to the secondary battery 41, and then the open and shut system cover 51 is closed. As described above, the portable telephone set 40 is put into and taken out of the accommodating section by opening/closing the open and shut system cover 51.

In charging operation with input of an AC power, a rotary type of power plug 18 is set in the socket 9A like that in Embodiment 4 described above. Then, when one edge 18a of the rotary type of power plug 18 is connected to, for instance, an AC power for home, the charging apparatus 400 converts, like that in Embodiment 4 described above, the AC power to a DC power via the rotary type of power plug 18 and the AC circuit unit 2. The charging apparatus 400 further converts the DC power to a required working voltage with the DC circuit unit 31, and supplies it to the portable telephone set 40 via the cables 32A, 32B. In this point of time, the portable telephone set 40 is supplied with a (+) power and a (−) power from the terminals 6A, 6B respectively, and charges the secondary battery 41 with a power as a charging power.

As described above, a DC power converted to a required working voltage by the DC—DC converter not shown herein in the DC circuit unit 31 is supplied to the portable telephone set 40, and the secondary battery 41 is charged with the charging power.

As described above, in Embodiment 5 of the present invention, the basic body comprises the accommodating section 400A for accommodating the portable telephone set 40 and the accommodating section 400B for accommodating the circuit section, and in the accommodating section 400A, the portable telephone set 40 is covered with the open and shut system cover 51, and an object to be hooked such as a belt or a component in a vehicle or the like can be hooked by a hook section 52, so that the portable telephone set 40 can easily be put into and taken out of the accommodating section by opening/closing the open and shut system cover 51, and also can easily be portable by hooking the hook section 52 in the object to be hooked.

In Embodiment 5 described above, the open and shut system cover 51 is pivotally provided therein so that the portable telephone set 40 can be put in and taken out of the accommodating section, but the cover may be detachably set therein like that in Embodiment 6 as described below.

Figure 8:
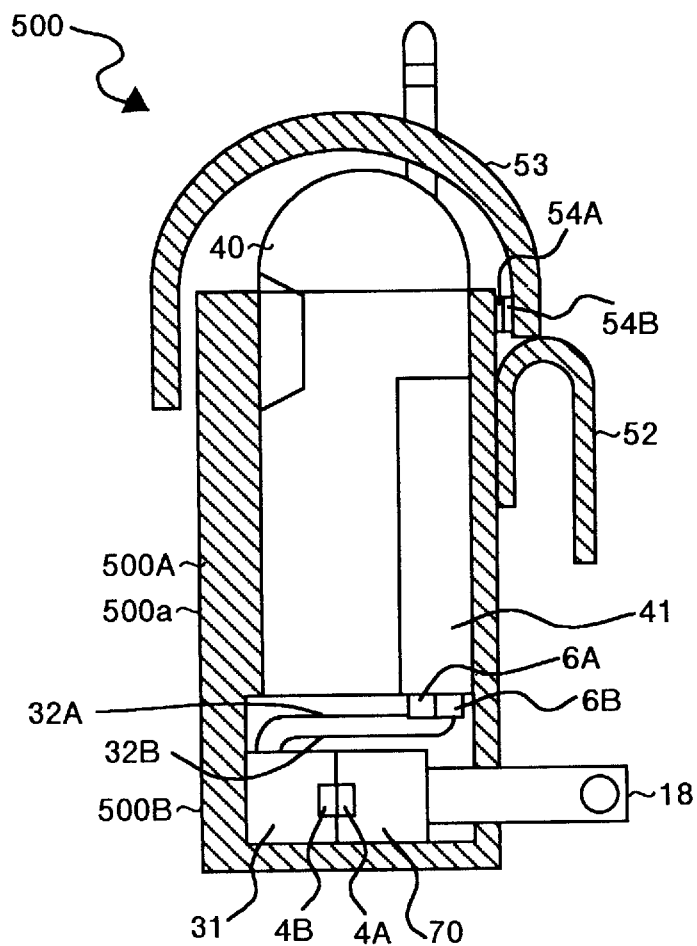
FIG. 8 is a cross-sectional view schematically showing the charging apparatus according to Embodiment 6 of the present invention.

FIG. 8 is a cross-sectional view schematically showing the charging apparatus according to Embodiment 6 of the present invention, and in the figure, the reference numeral 500 indicates a portable type of charging apparatus.

A main body 500a of the charging apparatus 500 according to Embodiment 6 of the present invention has an accommodating section 500A for directly accommodating the portable telephone set 40 and an accommodating section 500B for mounting thereon circuits of the AC circuit unit 70 and DC circuit unit 31, and also the charging apparatus has the general configuration like that of the charging apparatus 400 shown in FIG. 7. It should be noted that the same reference numerals are assigned to the same sections as those in the charging apparatus 400, and description thereof is omitted herein.

The charging apparatus 500 is different from the charging apparatus 400 described above in a construction of attaching a cover thereto. In the charging apparatus 500, as shown in FIG. 8, a cover 53 has an engaged section 54B for being engaged in an engaging section 54A provided on the outer surface of the accommodating section 500A.

Charging operations are the same as those in Embodiment 5 described above, so that description thereof is omitted herein, but, as previous preparation for the operations, the secondary battery 41 is set in the portable telephone set 40, the cover 53 is disengaged from the accommodating section 500A, and the portable telephone set 40 is accommodated in the accommodating section 500A. Then, the terminals 6A, 6B are connected to the secondary battery 41, and the cover 53 is attached to the portable telephone set 40 for covering. As described above, the portable telephone set 40 is putted into and taken out of the accommodating section 500A by detaching/attaching operations between the engaging section 54A of the accommodating section 500A and the engaged section 54B of the cover 53.

As described above, in Embodiment 6 of the present invention, the basic body comprises the accommodating section 500A for accommodating the portable telephone set 40 and the accommodating section 500B for accommodating the circuit section, and in the accommodating section 500A, the portable telephone set 40 is covered with the detachable system cover 53, and an object to be hooked such as a belt or components in a vehicle or the like can be hooked by the hook section 52, so that the portable telephone set 40 can easily be put into and taken out of the accommodating section by detaching/attaching the cover 53, and also can easily be portable by hooking the hook section 52 in the object to be hooked.

In Embodiments 5 and 6, the secondary battery 41 is connected to the terminals 6A, 6B, and a (+) power and a (-) power are supplied thereto, but the secondary battery may be charged by connecting the DC circuit unit to the portable telephone set with an I/O connector like in Embodiment 7 of the present invention as described below.

The charging apparatus according to Embodiment 7 of the present invention has the same general configuration like that of the charging apparatus 400 according to Embodiment 5 of the present invention, so that description concerning the general configuration is omitted herein and description is made only for different sections. Also it should be noted that the same reference numerals are assigned to the same sections as those in FIG. 7.

Figure 9:
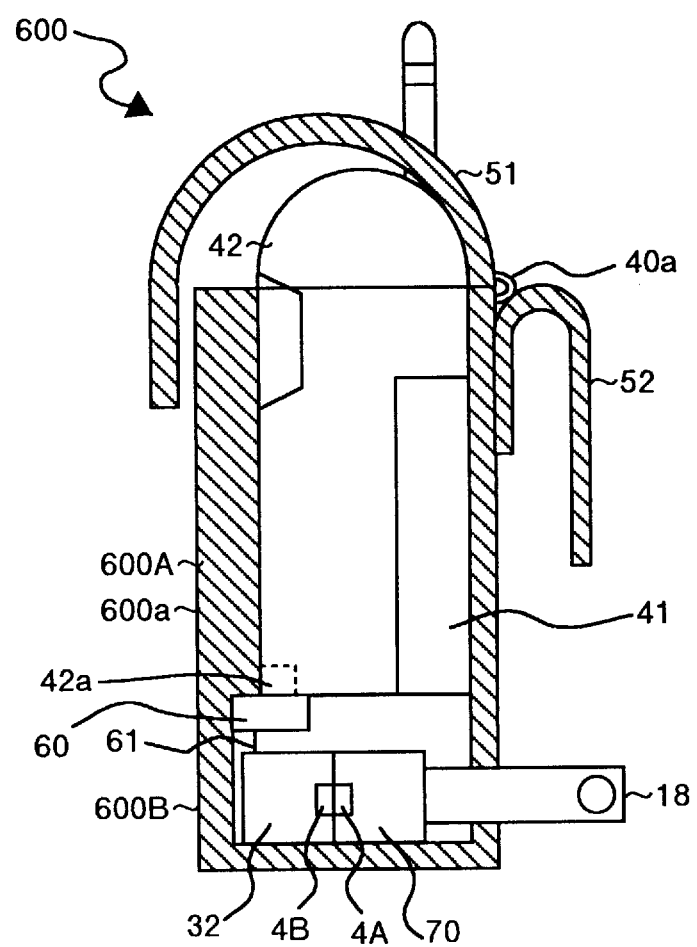
FIG. 9 is a cross-sectional view schematically showing the charging apparatus according to Embodiment 7 of the present invention.

FIG. 9 is a cross-sectional view schematically showing a charging apparatus according to Embodiment 7 of the present invention, and in the figure, the reference numeral 42 indicates a portable telephone set, and the reference numeral 600 indicates a portable type of charging apparatus.

As shown in FIG. 9, the charging apparatus 600 has the general configuration, for instance, like that according to Embodiment 5 (the charging apparatus 400 shown in FIG. 7), and an I/O connector 60 connected to the portable telephone set 42 is attached to one edge of an I/O connector cable 61, and the DC circuit unit 31 is attached to the other edge thereof for connecting to the portable telephone set 42.

The DC circuit unit 32, when a DC power is supplied from the AC circuit unit 70, converts the DC power to a require working voltage with the DC—DC converter not shown herein provided inside of the DC circuit unit like the DC circuit unit 31 described above.

A main body 600a of the charging apparatus 600 according to Embodiment 7 of the present invention has an accommodating section 600A having the same form as that of the accommodating section 400A for directly accommodating the portable telephone set 42, and an accommodating section 600B having the same form as that of the accommodating section 400B for mounting thereon circuits of the AC circuit unit 70 and DC circuit unit 32 or the like.

The terminals 6A, 6B are not connected to the secondary battery 41 set in the portable telephone set 42 accommodated in the accommodating section 600A, but a DC power is supplied from the DC circuit unit 32 to the main body of the portable telephone set 42. It should be noted that a DC power outputted from the DC circuit unit 32 to the I/O connector cables 61 is one that a DC power supplied from the AC circuit unit 2 is converted to a required working voltage. For this reason, a DC power supplied to the portable telephone set 42 via the I/O connector 60 has already been converted to a required working voltage, and the secondary battery 41 is charged with the power as a charging power.

Next description is made for operations. At first the secondary battery 41 is set in the potable telephone set 42, the potable telephone set 42 is accommodated in the accommodating section 600A by opening the open and shut system cover 51, the terminals 6A, 6B are connected to the connector 42a of the portable telephone set 42, and then the open and shut system cover 51 is closed. As described above, the portable telephone set 42 is put into and taken out of the accommodating section by opening/closing the open and shut system cover 51.

In charging operation with input of an AC power, a rotary type of power plug 18 is set in the socket 9A like that in Embodiment 5 of the present invention. Then, when one edge 18a of the rotary type of power plug 18 is connected to, for instance, an AC power for home, the AC power is converted to a DC power through the rotary type power plug 18 and the AC circuit unit 2 like that in Embodiment 5 of the present invention, and converted to a required working voltage by the DC circuit unit 32. Then the DC power through the DC circuit unit 32 is further supplied to the portable telephone set 42 via the I/O connector cable 61. The portable telephone set 42 charges the secondary battery 41 with a DC power supplied from the DC circuit unit 32 as a charging power.

As described above, a DC power converted to a required working voltage by the DC—DC converter not shown herein in the DC circuit unit 32 is supplied to the portable telephone set 42, and the secondary battery 41 is charged with the charging power.

As described above, in Embodiment 7 of the present invention, the basic body comprises the accommodating section 600A for accommodating the portable telephone set 42 and the accommodating section 600B for accommodating the circuit section, and in the accommodating section 600A, the portable telephone set 42 is covered with the open and shut system cover 51, and an object to be hooked such as a belt or components in a vehicle or the like can be hooked by a hook section 52, so that the portable telephone set 42 can easily be put into and taken out of the accommodating section by opening/closing the open and shut system cover 51, and also can easily be portable by hooking the hook section 52 in the object to be hooked.

In Embodiment 7 described above, the portable telephone set 42 is put into and taken out of the accommodating section by pivotally provided the open and shut system cover 51 therein, but the cover may detachably be set therein like that in Embodiment 8 described below.

Figure 10:
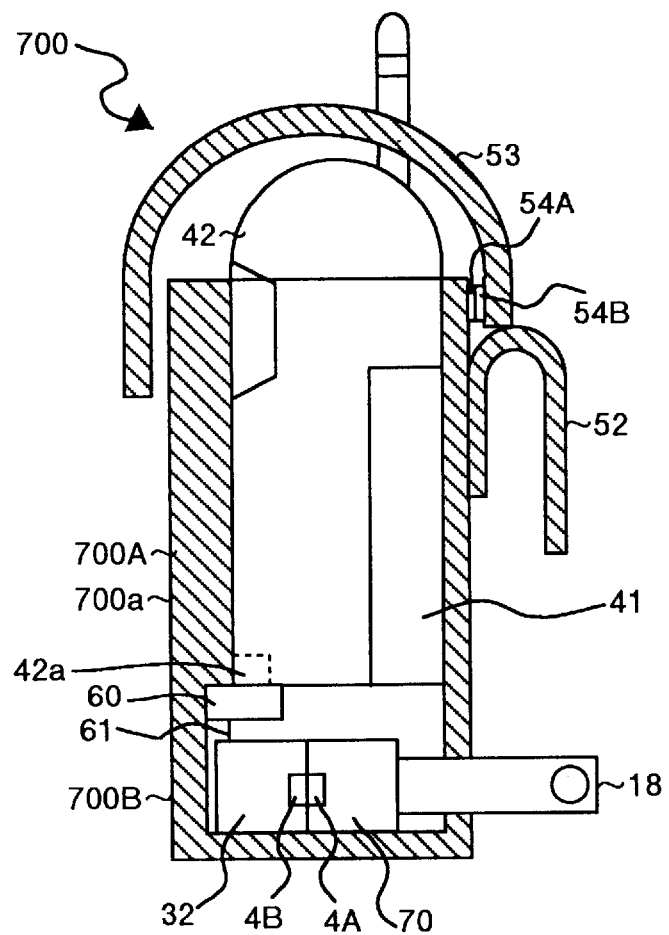
FIG. 10 is a cross-sectional view schematically showing the charging apparatus according to Embodiment 8 of the present invention.

FIG. 10 is a cross-sectional view schematically showing a charging apparatus according to Embodiment 8 of the present invention, and in the figure, the reference numeral 700 indicates a portable type of charging apparatus.

A main body 700a of the charging apparatus 700 according to Embodiment 8 of the present invention has an accommodating section 700A for directly accommodating the portable telephone set 42 and an accommodating section 700B for mounting thereon circuits of the AC circuit unit 70 and DC circuit unit 32, and also the charging apparatus has the general configuration like that of the charging apparatus 600 shown in FIG. 9. It should be noted that the same reference numerals are assigned to the same sections as those in the charging apparatus 600 (Embodiment 7), and description thereof is omitted herein.

The charging apparatus 700 is different from the charging apparatus 600 described above in a construction of attaching a cover thereto. In the charging apparatus 700, as shown in FIG. 10, the cover 53 has the engaged section 54B for being engaged in the engaging section 54A provided on the outer surface of the accommodating section 700A.

Charging operations are the same as those in Embodiment 7 of the present invention, so that description thereof is omitted herein, but, as previous preparation for the operations, the secondary battery 41 is set in the portable telephone set 42, the cover 53 is disengaged from the accommodating section 700A, and the portable telephone set 42 is accommodated in the accommodating section 700A. Then, the I/O connector 60 is connected to the connector 42a of the portable telephone set 42, and the cover 53 is attached to the portable telephone set 42 for covering. As described above, the portable telephone set 42 is putted into and taken out of the accommodating section 700A by detaching/attaching operations between the engaging section 54A of the accommodating section 700A and the engaged section 54B of the cover 53.

As described above, in Embodiment 8 of the present invention, the basic body comprises the accommodating section 700A for accommodating the portable telephone set 42 and the accommodating section 700B for accommodating the circuit section, and in the accommodating section 700A, the portable telephone set 42 is covered with the detachable system cover 53, and an object to be hooked such as a belt or components in a vehicle or the like can be hooked by the hook section 52, so that the portable telephone set 42 can easily be put into and taken out of the accommodating section by detaching/attaching the cover 53, and also can easily be portable by hooking the hook section 52 in the object to be hooked.

In any of Embodiments 5 to 8 of the present invention, a power is supplied from the rotary type of power plug 18 for an AC power, but a power may further be supplied from the AC power supply section 7 and DC power supply section 8 like that in Embodiment 9 described below.

Figure 11:
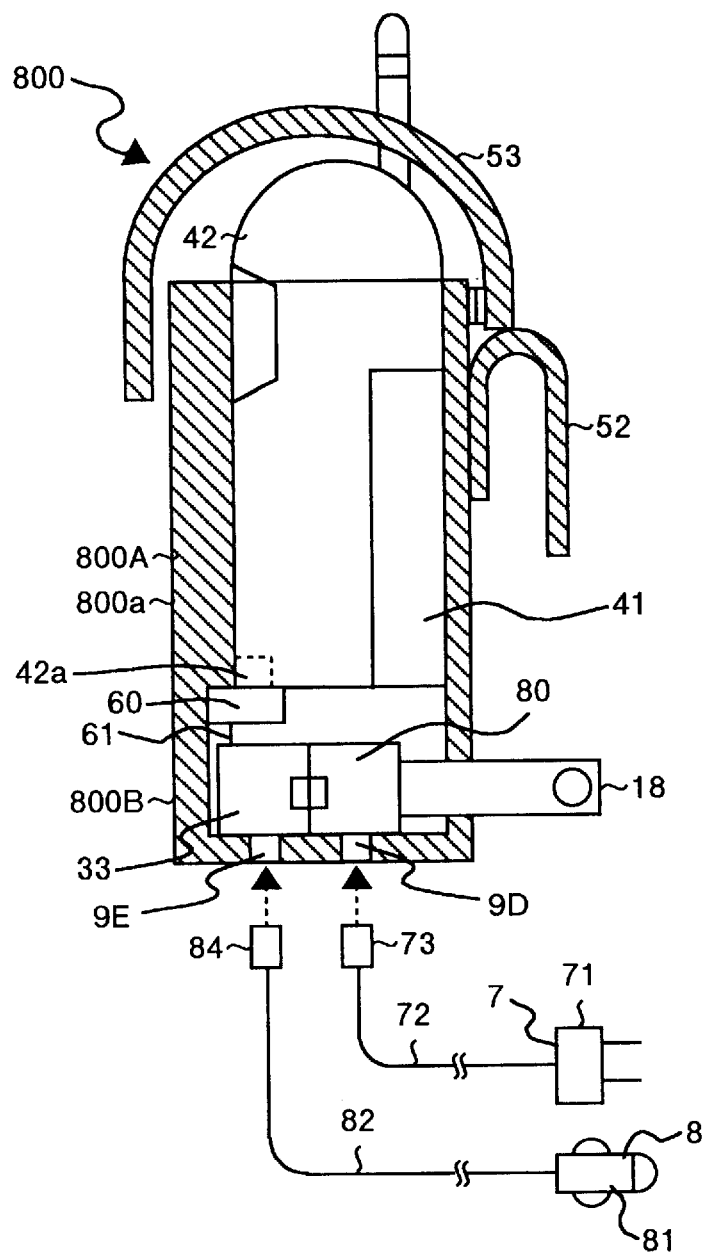
FIG. 11 is a cross-sectional view schematically showing the charging apparatus according to Embodiment 9 of the present invention.
Figure 12:
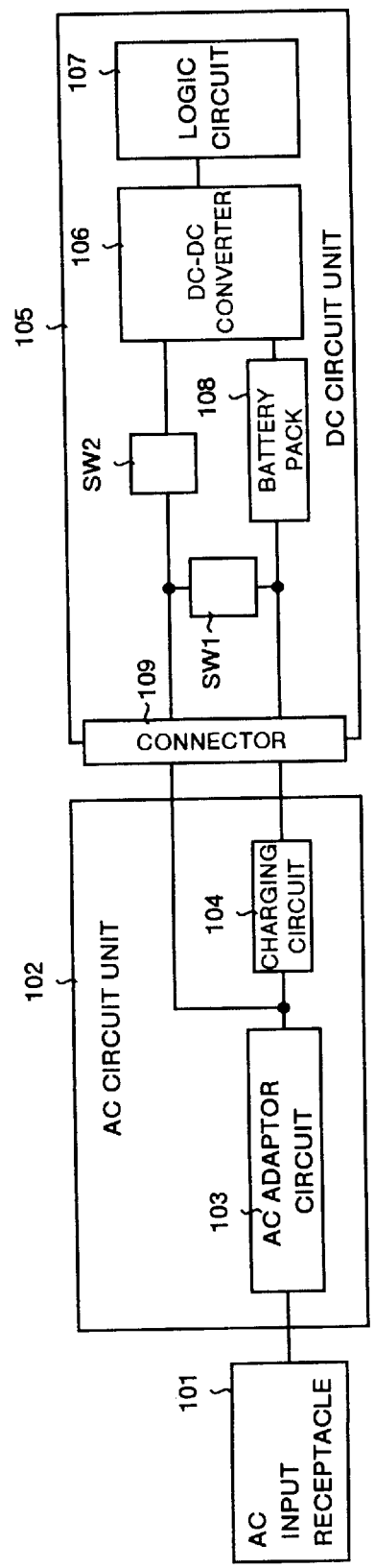
FIG. 12 is a block diagram schematically showing a charging apparatus based on the conventional technology.

FIG. 11 is a cross-sectional view schematically showing a charging apparatus according to Embodiment 9 of the present invention, and in the figure, the reference numeral 800 indicates a portable type of charging apparatus.

A main body 800a of the charging apparatus 800 according to Embodiment 9 of the present invention has an accommodating section 800A for directly accommodating the portable telephone set 42 and an accommodating section 800B for mounting thereon circuits of the AC circuit unit 80 and DC circuit unit 33, and also the charging apparatus has the general configuration like that according to Embodiment 8 (the charging apparatus 700 shown in FIG. 10). It should be noted that the same reference numerals are assigned to the same sections as those in the charging apparatus 700 (Embodiment 8), and description thereof is omitted herein.

The charging apparatus 800 is different from the charging apparatus 700 described above in a socket 9D added to the AC circuit unit 80 and in a socket 9E added to the DC circuit unit 33.

Charging operations are the same as those in Embodiment 7 of the present invention, so that description thereof is omitted herein, but, as previous preparation for the operations, the secondary battery 41 is set in the portable telephone set 42, the cover 53 is disengaged from the accommodating section 800A, and the portable telephone set 42 is accommodated in the accommodating section 800A. Then, the I/O connector 60 is connected to the connector 42a of the portable telephone set 42, and the cover 53 is attached to the portable telephone set 42 for covering. As described above, the portable telephone set 42 is putted into and taken out of the accommodating section 800A by detaching/attaching operations between the engaging section 54A of the accommodating section 800A and the engaged section 54B of the cover 53.

Also, in a case where charging is executed with input of an AC power, a plug 73 of the AC power supply section 7 is set in the socket 9D in the same connecting relation as that in Embodiment 1. Also in a case where charging is executed with input of an DC power, a plug 83 of the DC power supply section 8 is set in the socket 9E in the same connecting relation as that in Embodiment 1.

As described above, in Embodiment 9 of the present invention, the same effects as those in Embodiments 5 to 8 can be obtained, so that the AC circuit unit 80 and DC circuit unit 33 can be applied to various types of uses, and each circuit unit can be used as a single body for various purposes.

In Embodiment 9 of the present invention, as a modified example thereof, the same effects as those in Embodiment 9 described above can be obtained even if the terminals 6A, 6B and cables 32A, 32B described above are used in place of the I/O connector 60 and I/O connector cable 61.

In Embodiments 5 and 6 of the present invention, a power is supplied to the secondary battery 41 with the terminals 6A, 6B and cables 32A, 32B, and in Embodiments 7 to 9, a power is supplied to the secondary battery 41 with the I/O connector 60 and I/O connector cable 61, so that, by combining these means described above, two systems may be employed such as one charging system with the terminals 6A, 6B and cables 32A, 32B, and the other charging system with the I/O connector 60 and I/O connector cable 61. In this case, either of the two charging systems can appropriately be used according to any type of portable telephone sets.

As described above, with the present invention, in a case where an AC power is supplied from an AC power source to the AC circuit unit, the AC circuit unit is connected to the DC circuit unit, a DC power is supplied from the AC circuit unit to the DC circuit unit, and the DC power is converted to a required working voltage, while in a case where a DC power is supplied from the DC power source to the DC circuit unit, the DC power is converted to a required working voltage, and a secondary battery is charged with the DC power obtained as described above as a charging power, so that it is possible to obtain a charging apparatus in which the AC circuit unit and DC circuit unit are applicable to various types of uses, and each of the circuit units can also be used as a single body according to a particular use.

With another feature of the present invention, in a case where an AC power is supplied to the AC circuit unit, a position of the DC circuit unit in which a DC power supply means is set is covered and a position of the AC circuit unit in which an AC power supply means is set is exposed to outside, and in a case where a DC power is supplied to the DC circuit unit, a position of the AC circuit unit in which the DC power supply means is set is covered and a position of the DC circuit unit in which the DC power supply means is set is exposed to outside, and for this reason, with this feature, it is possible to obtain a charging apparatus in which a power supply side can be prevented from being set in an incorrect position of the circuit units when it is to be charged.

With another feature of the present invention, in a case where an AC power is supplied from the AC power source to the AC circuit unit, the AC circuit unit is connected to the DC circuit unit, a rotary AC power supply means is rotated to a desired position about the AC circuit unit as an axis, a DC power is supplied from the AC circuit unit to the DC circuit unit, and the DC power is converted to a required working voltage, while in a case where a DC power is supplied from the DC power source to the DC circuit unit, the DC power is converted to a required working voltage, and a secondary battery is charged with the DC power obtained as described above as a charging power, so that it is possible to obtain a charging apparatus in which the AC circuit unit and DC circuit unit are applicable to various types of uses, and each of the circuit units can also be used as a single body according to a particular use.

With another feature of the present invention, in a case where an AC power is supplied to the AC circuit unit, a position of the DC circuit unit in which the DC power supply means is set is covered, and the other edge thereof is exposed to outside by rotating the rotary AC power supply means, and in a case where a DC power is supplied to the DC circuit unit, the rotary AC power supply means is rotated and accommodated inside thereof to cover it from outside, and a position of the DC circuit unit in which the DC power supply means is set is exposed to outside, and for this reason, it is possible to obtain a charging apparatus in which a power supply side can be prevented from being set in an incorrect position of the circuit units when it is to be charged.

With another feature of the present invention, in a case where an AC power is supplied from the AC power source to the AC circuit unit, the AC circuit unit is connected to the DC circuit unit, a DC power is supplied from the AC circuit unit to the DC circuit unit, and the DC power is converted to a required working voltage, while in a case where a DC power is supplied from the DC power source to the DC circuit unit, the DC power is converted to a required working voltage, and the DC power obtained as described above is supplied to an external device as a charging power by connecting the DC circuit unit to the external device, so that it is possible to obtain a charging apparatus in which the AC circuit unit and DC circuit unit are applicable to the use for charging a secondary battery in an external device.

With another feature of the present invention, the main body thereof comprises a first accommodating section for accommodating the external device and a second accommodating section for accommodating a circuit section, and the first accommodating section covers the external device with a cover based on an open and shut system and an object to be hooked can be hooked by a hook section, so that it is possible to obtain a charging apparatus in which the external device can easily be put into and taken out of the first accommodating section by opening/closing the cover, and can easily be portable by hooking the hook section in the object to be hooked.

With another feature of the present invention, the main body thereof comprises a first accommodating section for accommodating the external device and a second accommodating section for accommodating a circuit section, and the first accommodating section covers the external device with a cover detachably provided thereon, and an object to be hooked can be hooked by a hook section, so that it is possible to obtain a charging apparatus in which the external device can easily be put into and taken out of the first accommodating section by detaching/attaching the cover, and can easily be portable by hooking the hook section in the object to be hooked.

With another feature of the present invention, the main body thereof comprises a first accommodating section for accommodating the external device and a second accommodating section for accommodating a circuit section, and the first accommodating section covers the external device with a cover, and an object to be hooked can be hooked by a hook section, so that it is possible to obtain a charging apparatus in which the external device can easily be put into and taken out of the first accommodating section by detaching/attaching the cover, and can easily be portable by hooking the hook section in the object to be hooked, and especially, the AC circuit unit and DC circuit unit are applicable to various types of uses, and each of the circuit units can also be used as a single body according to a particular use.

This application is based on Japanese patent application No. HEI 8-212903 filed in the Japanese Patent Office on Aug. 12, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A charging apparatus for supplying charging power to an external device, comprising:

a main body having a first accommodating section for accommodating said external device and a second accommodating section for accommodating a circuit section; wherein said first accommodating section pivotally supports a cover for covering said external device when said external device is accommodated therein;

said circuit section comprises:

an AC circuit unit for converting AC power to DC power;

an AC power supply means for receiving AC power from an AC power source and supplying the power to said AC circuit unit;

a DC circuit unit for obtaining charging power by converting DC power to a required working voltage;

a connecting means for connecting said AC circuit unit to said DC circuit unit to supply power from said AC circuit unit to said DC circuit unit; and a DC power supply means for connecting said DC circuit unit to said external device to supply charging power from said DC circuit unit to said external device.

2. A charging apparatus according to claim 1 further comprising means for receiving DC power from a DC power source and supplying the power to said DC circuit unit.

3. A charging apparatus for supplying charging power to an external device, comprising:

a main body having a first accommodating section for accommodating said external device and a second accommodating section for accommodating a circuit section; wherein said first accommodating section has a detachably provided cover for covering an upper section of said external device when said external device is accommodated therein;

said circuit section comprises:

an AC circuit unit for converting AC power to DC power;

an AC power supply means for receiving AC power from an AC power source and supplying the power to said AC circuit unit;

a DC circuit unit for obtaining charging power by converting DC power to a required working voltage;

a connecting means for connecting said AC circuit unit to said DC circuit unit to supply DC power from said AC circuit unit to said DC circuit unit; and a DC power supply means for connecting said DC circuit unit to said external device to supply charging power from said DC circuit unit to said external device.

4. A charging apparatus according to claim 3 further comprising means for receiving DC power from a DC power source and supplying the power to said DC circuit unit.

5. A charging apparatus for charging a secondary battery, comprising:

an AC circuit unit for converting AC power to DC power;

an AC power supply means for connecting said AC circuit unit directly to an AC power source for supplying said AC power to said AC circuit unit;

a DC circuit unit for providing charging power for said secondary battery by converting DC power to a required working voltage through a DC-to-DC voltage conversion;

a DC power supply means for connecting said DC circuit unit directly to a DC power source for supplying DC power to said DC circuit unit;

a connecting means for connecting said AC circuit unit to said DC circuit unit for supplying DC power from said AC circuit unit to said DC circuit unit; and means for covering a position of said DC circuit unit in which said DC power supply means is set for protection against the outside environment and exposing a position of said AC circuit unit in which said AC power supply means is exposed to the outside environment when said AC power supply means is set in said AC circuit unit, and covering a position of said AC circuit unit in which said AC power supply means is set for protection against the outside environment and exposing a position of said DC circuit unit in which said DC power supply means is exposed to the outside environment when said DC power supply means is set in said DC circuit unit.

6. A charging apparatus for charging a secondary battery, comprising:

an AC circuit unit for converting AC power to DC power;

a rotary type of AC power supply having one end pivotally supported on said AC circuit unit and another end set in an AC power source for supplying said AC power to said AC circuit unit;

a DC circuit unit for providing charging power for said secondary battery by converting DC power to a required working voltage through a DC-to-DC voltage conversion;

a DC power supply means for connecting said DC circuit unit directly to a DC power source for supplying DC power to said DC circuit unit;

a connecting means for connecting said AC circuit unit to said DC circuit unit for supplying DC power from said AC circuit unit to said DC circuit unit; and means for covering a position of said DC circuit unit in which said DC power supply means is set for protection against the outside environment, rotating said rotary type of AC power supply, and exposing the other end thereof to the outside environment when said rotary type of AC power supply is set in said AC power source, and also for rotating said rotary type of AC power supply, covering it for protection against the outside environment and exposing a position of said DC circuit unit in which said DC power supply is exposed to the outside environment when said DC power supply is set in said DC circuit unit.

* * * * *